(12) United States Patent
Wechs et al.

(10) Patent No.: US 11,807,102 B2
(45) Date of Patent: Nov. 7, 2023

(54) GEAR UNIT AND POWERTRAIN FOR A VEHICLE

(71) Applicant: ZF FRIEDRICHSHAFEN AG, Friedrichshafen (DE)

(72) Inventors: Michael Wechs, Weißensberg (DE); Fabian Kutter, Kressbronn (DE); Thomas Martin, Weissensberg (DE); Oliver Schaudt, Cologne (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 17/876,115

(22) Filed: Jul. 28, 2022

(65) Prior Publication Data

US 2023/0078446 A1    Mar. 16, 2023

(30) Foreign Application Priority Data

Aug. 6, 2021    (DE) .................. 10 2021 208 557.1

(51) Int. Cl.
*B60K 6/365*    (2007.10)
*B60K 6/547*    (2007.10)

(52) U.S. Cl.
CPC .............. *B60K 6/365* (2013.01); *B60K 6/547* (2013.01)

(58) Field of Classification Search
CPC .. B60K 6/365; B60K 6/547; B60K 2001/001; B60K 2200/0021; B60K 1/00; B60K 17/02; B60K 17/04; B60K 17/08; B60K 17/16; F16H 3/54; F16H 37/082; F16H 2200/0034; F16H 2200/2005; F16H 2200/2035; F16H 2200/2097
See application file for complete search history.

(56) References Cited

U.S. PATENT DOCUMENTS

| | | | |
|---|---|---|---|
| 11,472,277 B2 * | 10/2022 | Glückler | .................. B60K 1/02 |
| 2015/0065287 A1 | 3/2015 | Petersen et al. | |
| 2018/0073610 A1 * | 3/2018 | Beck | ....................... F16H 3/663 |

FOREIGN PATENT DOCUMENTS

| | | |
|---|---|---|
| DE | 102017211881 | 1/2019 |
| DE | 102018211672 | 1/2020 |

(Continued)

OTHER PUBLICATIONS

Machine translation of DE102018123267A1 filed Apr. 17, 23, pp. 1-7 (Year: 2023).*

(Continued)

*Primary Examiner* — Tisha D Lewis
(74) *Attorney, Agent, or Firm* — Cozen O'Connor

(57) ABSTRACT

A gear unit for a powertrain and a powertrain including a stepped planetary gearset, a first gear shifting element and a second gear shifting element. The stepped planetary gearset has a first sun gear, a first ring gear, a second ring gear, and stepped planet gears rotatably mounted at a first planet carrier. The first ring gear is fixed with respect to rotation to an output shaft of the gear unit. The second ring gear is fixed with respect to rotation to a housing. The first gear shifting element drivingly connects the first sun gear to an electric machine in a closed state, and the second gear shifting element drivingly connects the first planet carrier to the electric machine in a closed state, and one of the two gear shifting elements is in the closed state for driving the output shaft in rotation.

14 Claims, 4 Drawing Sheets

(56) References Cited

FOREIGN PATENT DOCUMENTS

| | | | | |
|---|---|---|---|---|
| DE | 102018123267 | 3/2020 | | |
| DE | 102018131492 A1 * | 6/2020 | ............. | F16H 37/08 |
| DE | 102019202994 A1 * | 9/2020 | ........... | B60B 35/001 |
| WO | WO 2005120877 | 12/2005 | | |
| WO | WO 2014139744 | 9/2014 | | |

OTHER PUBLICATIONS

Office Action for corresponding German Patent Application No. 10 2021 208 557.1.

* cited by examiner

GEAR UNIT AND POWERTRAIN FOR A VEHICLE

BACKGROUND OF THE INVENTION

1. Field of the Invention

The disclosure is directed to a gear unit for a powertrain of an at least partially electrically driven vehicle. The disclosure is further directed to a powertrain comprising such a gear unit.

2. Description of Related Art

A powertrain for a vehicle with at least one electric drive that is couplable with at least a first transmission ratio stage and a second transmission ratio stage via a driveshaft is known from the publication WO 2014/139 744 A1. At least one shifting device is provided for shifting the transmission ratio stages, this shifting device comprising at least one positively engaging shifting element and at least one frictionally engaging shifting element for carrying out power shifts. Each of the transmission ratio stages can be shifted with the positively engaging shifting element. At least one of the ratio stages can be shifted with the positively engaging shifting element as well as with the frictionally engaging shifting element.

SUMMARY OF THE INVENTION

It is an object of one aspect of the present invention to propose an alternative two-speed gear unit and an alternative powertrain with a two-speed gear unit. This object is met according to a first aspect of the invention by a gear unit. The object is further met according to a second aspect of the invention by a powertrain.

According to a first aspect of the invention, a gear unit for a powertrain of an at least partially electrically driven vehicle comprises a stepped planetary gearset, a first gear shifting element and a second gear shifting element. The stepped planetary gearset has a first sun gear, a first ring gear, a second ring gear, and a plurality of stepped planet gears rotatably mounted on a first planet carrier. The first ring gear is connected to an output shaft of the gear unit to be fixed with respect to rotation relative to it. The second ring gear is connected to a housing to be fixed with respect to rotation relative to it. The first gear shifting element is configured to drivingly connect the first sun gear to an electric machine in a closed state, the second gear shifting element is configured to drivingly connect the first planet carrier to the electric machine in a closed state, and an individual one of the two gear shifting elements is in the closed state for driving the output shaft in rotation. A gear unit of this kind enables a two-speed drive of the vehicle, and a ratio step of between 1.7 and 2.5, preferably a ratio step of approximately 2.0, is advantageously made possible by the gear unit. A further advantage of such a construction of the gear unit consists in the high efficiencies which can be realized.

"Operative connection" or "driving connection" means a connection between two torque-conducting parts that allows a torque or power to be transferred between these parts. In particular, the two parts are correspondingly rotatably mounted. Driving connections are connections which have no gear ratio or intermediate component parts but also those having a gear ratio or intermediate component parts. For example, two shafts or two toothed wheels can have further shafts and/or toothed wheels drivingly arranged therebetween.

To form a gear step, either the first sun gear or the first planet carrier is connected to the electric machine, in particular to a rotor or a rotor shaft of the electric machine, via the respective gear shifting element. In rotor operation of the electric machine, the rotor shaft of the electric machine serves as output shaft of the electric machine. The first sun gear and the first planet carrier are input shafts of the stepped planetary gearset in rotor operation of the electric machine. In rotor operation of the electric machine, electrical energy is fed to the electric machine from an energy accumulator, for example, in particular a battery, as a result of which a rotation of the rotor is brought about for generating a motive power, this motive power being provided for driving the first ring gear in rotation. In generator operation, on the other hand, electrical energy is generated by the electric machine. The output shaft of the gear unit functions as input shaft in generator operation of the electric machine, whereas the first sun gear and the first planet carrier are accordingly formed as output shafts of the gear unit via the respective gear shifting element, and a motive power of the vehicle is conducted via the gear unit and the respective gear shifting element into the electric machine so that electrical energy is generated by the electric machine and can be fed into a battery for storage. In generator operation, the output, for example, from one or more rotating wheels of the vehicle is introduced into the electric machine via the gear unit and the respective gear shifting element.

The expression "at least indirectly" means that two component parts are connected to one another via at least one further component part arranged therebetween or are directly and, therefore, immediately connected to one another. Consequently, still further component parts can be arranged between shafts or toothed wheels and operatively connected to the shaft or toothed wheel, respectively.

By "shaft", be this an input shaft, an output shaft, an intermediate shaft or the like, is understood within the meaning of the invention a rotatable component part of the powertrain for transmitting torques and via which associated components of the powertrain are connected to one another so as to co-rotate or via which such a connection is produced when a corresponding shifting element or gear shifting element is actuated.

The first sun gear is in meshing engagement with a first toothed wheel of the respective stepped planet gear of the stepped planetary gearset, the first toothed wheel also meshingly engaging with the first ring gear. The respective stepped planet gear has a second toothed wheel arranged coaxial to and so as to co-rotate with the first toothed wheel which is in meshing engagement with the second ring gear. The two toothed wheels of the respective stepped planet gear have different diameters and numbers of teeth. In particular, the first toothed wheel has a smaller diameter than the second toothed wheel. The advantage in providing a stepped planetary gearset consists in that a second ring gear can be dispensed with so that a cost-optimized gear unit is provided. Toothed wheels engaging with one another or meshing with one another transmit a rotational speed and a torque via their intermeshing teeth.

The first sun gear and the second sun gear are arranged, for example, coaxial to and rotatable relative to one another. Preferably, one of the sun gears is at least partially guided axially through the other sun gear. Consequently, at least one of the sun gears is connected to a hollow shaft.

Depending on the shifting position or state of the two gear shifting elements, the first ring gear transmits a motive power with a respective gear ratio at least indirectly to the driven shafts of the vehicle, which are at least indirectly connected, respectively, to at least one wheel of the vehicle. The driven shafts are arranged coaxial to the output axis. Therefore, at least one wheel of the vehicle is at least indirectly driven in rotation via the driven shaft by the motive power generated with the electric machine and converted at least with the gear unit.

By "gear shifting element" is meant a connection part by which at least one torque-transmitting part is drivingly connectible to a further torque-transmitting part or to a stationary or fixed part. The respective gear shifting element is shiftable between at least one open state and a closed state. In the open state, the gear shifting element cannot transmit any torque between two parts cooperating with the gear shifting element and, in the closed state, the gear shifting element can transmit a torque between the two parts cooperating with the gear shifting element. Insofar as a driving connection exists between two gear unit elements, torques and forces and—depending on the construction of the gear unit elements—possibly a rotational speed are transmitted from a gear unit element to the other gear unit element. The respective gear shifting element is formed to be positively engaging or frictionally engaging, for example.

When the first gear shifting element is in the closed state or is shifted into the closed state and the second gear shifting element is open, a motive power is transmitted from the gear unit input to the gear unit output, or vice versa, in a first gear or a first gear step, namely, with a first gear ratio or a first transmission ratio. The second ring gear of the gear unit is supported against the housing or connected to the housing so as to be fixed with respect to rotation relative to it. In the closed state of the first gear shifting element, the second gear shifting element is in the open state in order to introduce the motive power via the first sun gear of the gear unit and transmit it to the output shaft of the gear unit with a first gear ratio. For example, a first gear ratio is greater than 1.

When the second gear shifting element is in the closed state, or is shifted into the closed state, and the first gear shifting element is open, a motive power is transmitted from the gear unit input to the gear unit output, or vice versa, in a second gear or second gear step, namely, with a second gear ratio or second transmission ratio. The second ring gear of the gear unit is supported against the housing or connected to the housing so as to be fixed with respect to rotation relative to it. In the closed state of the second gear shifting element, the first gear shifting element is in the open state in order to introduce the motive power via the first planet carrier of the gear unit and transmit it to the output shaft of the gear unit with a second gear ratio. For example, a second gear ratio is greater than 1. Consequently, either the first gear shifting element or the second gear shifting element is closed in order to drive the vehicle.

If both gear shifting elements are open, no motive power is introduced into the gear unit and, accordingly, no motive power is transmitted to the output shaft of the gear unit. Thus the gear unit is idling. On the other hand, if both gear shifting elements are closed, a rotation of the output shaft is blocked. To this extent, the two gear shifting elements are simultaneously in a closed state in order to realize a park lock function.

The first gear shifting element and/or the second gear shifting element is preferably formed as frictionally engaging shifting element. In particular, the frictionally engaging shifting element can be formed as a friction-type shifting element, particularly as a multiple-disk clutch or cone clutch, in order to produce a frictionally engaging connection between the first sun gear and the rotor shaft of the electric machine or between the first planet carrier and the rotor shaft of the electric machine. A frictionally engaging shifting element is one that introduces a normal force to two parts or surfaces of gear unit elements to be connected to one another, a mutual displacement of the parts or surfaces being prevented until a counterforce brought about substantially by static friction is exceeded. Accordingly, a frictional engagement is formed for transferring a torque between the gear unit elements to be connected.

According to the first aspect of the invention, a power shifting between the gears, that is, a shifting between a first gear and a second gear, or vice versa, is advantageously possible with the gear unit according to the invention without interrupting the motive power at the output or at the output shaft particularly during a shifting process. It is advantageous that separate power shifting elements need not be provided for this purpose. Rather, the gear unit can be outfitted with frictionally engaging gear shifting elements having a simpler construction. For traction shifting or coasting shifting, it is required that at least one of the gear shifting elements is constructed as a frictionally engaging gear shifting element or as a friction-type shifting element. However, for traction shifting and coasting shifting by the gear shifting elements, it is required that both gear shifting elements are constructed as frictionally engaging gear shifting elements. On the other hand, the other respective gear shifting element not formed as frictionally engaging shifting element can be formed as positively engaging gear shifting element or jaw-type shifting element. Accordingly, one gear shifting element or both gear shifting elements can bring about a power shift. A gear shifting element which realizes a power shift is a shifting element that allows two gear unit elements to be connected to one another, while a motive power, particularly a torque, is applied to the one gear unit element so that the motive power is transmitted to the other gear unit element after closing. It is not necessary to synchronize the speeds of the gear unit elements in question before a power shifting element is closed.

Alternatively, the first gear shifting element and/or the second gear shifting element is formed as a positively engaging shifting element. A positively engaging shifting element can be formed, for example, as a jaw-type shifting element for realizing a positively engaging connection. A positively engaging shifting element is one in which two parts of the gear unit engage one inside the other and form a positive engagement for transmitting a torque between two gear unit elements. Compared to the frictionally engaging shifting element, a positively engaging shifting element is cheaper and, above all, efficiency-optimized.

According to an aspect of the invention, the two gear shifting elements are formed jointly as a double shifting element. This means that the first gear shifting element and second gear shifting element are arranged directly axially adjacent one another and the two gear shifting elements are combined to form a unit. This is particularly advantageous when both shifting elements are constructed as jaw-type shifting elements for realizing a positively engaging connection between the first sun gear and the rotor shaft of the electric machine or between the first planet carrier and the rotor shaft of the electric machine. In this case, no power shifting is possible between the first gear and the second gear, or vice versa, but axial installation space for the gear unit can be saved by arranging and configuring the gear shifting elements in this way. Moreover, the construction of the gear shifting elements as jaw-type shifting elements facilitates realization of the park lock function, i.e., when the two gear shifting elements are moved into, or are in, the closed state.

According to one aspect of the invention, a powertrain for an at least partially electrically driven vehicle comprises a gear unit according to the first aspect of the invention, an electric machine, and a differential that drivingly connects the gear unit to two driven shafts arranged coaxial to an output axis. A powertrain of this kind is compactly constructed with the gear unit according to the invention and realizes a relatively high ratio step.

The differential is preferably formed as bevel gear differential. Further, other alternative embodiment forms of the differential are also conceivable, for example, a spur gear differential or planetary differential. The motive power coming from the gear unit with a first gear ratio or second gear ratio is transmitted from the output shaft of the gear unit to the two driven shafts at least indirectly via the differential. The differential distributes the motive power, i.e., a rotational speed and a torque, to the driven shafts. The differential is also arranged on the output axis so that the driven shafts extend coaxial to the output axis. A differential formed as bevel gear differential has two output elements on the wheel side, particularly a first driven wheel and a second driven wheel. The two driven wheels mesh, respectively, with a compensating element. The compensating elements are mounted in a differential carrier so as to be rotatable around their own axes. The respective driven wheel is connected to the respective driven shaft so as to be fixed with respect to rotation relative to it. The differential is driven via the differential carrier.

The powertrain preferably comprises a planetary gear assembly which is drivingly connected to the output shaft of the gear unit and which has at least a first planetary gearset. The first planetary gearset is advantageously formed as a negative planetary gearset, and an overall gear ratio is increased by the planetary gearset depending on the respective gear speed selected in the gear unit. An overall gear ratio between 6 and 13.5 is preferably realizable by the planetary gear assembly arranged in the power flow downstream of the gear unit. A negative planetary gearset is formed of sun gear, planet carrier and ring gear. The planet carrier guides at least one, but preferably a plurality of rotatably mounted planet gears, each of which meshes or is in meshing engagement with the sun gear as well as with the surrounding ring gear.

In particular, the first planetary gear set of the planetary gear assembly has a second sun gear fixed with respect to the housing, a third ring gear and a plurality of planet gears rotatably mounted on a second planet carrier, the third ring gear being connected to the first ring gear of the gear unit so as to be fixed with respect to rotation relative to it. The planetary gear assembly is formed to be axially compact. The planet gears are in meshing engagement with the third ring gear as well as with the second sun gear. Further, the second planet carrier rotatably receiving the planet gears is operatively connected to a second output shaft that can preferably be guided axially through the gear unit and/or the electric machine in order to conduct the motive power into the differential and save axial installation space at the same time.

A differential carrier of the differential is preferably connected to the second planet carrier of the planetary gear assembly so as to be fixed with respect to rotation relative to it. Further, it is conceivable that the second output shaft is formed at least partially hollow so that one of the two driven shafts of the differential can be guided through axially. In other words, the second output shaft can be arranged radially inside of the first planet carrier of the gear unit, and one of the two driven shafts of the differential can be arranged radially inside of the second output shaft so as to be rotatable relative to it.

At least the gear unit and/or the differential are/is preferably arranged at least partially or completely spatially inside of the rotor of the electric machine. Arranging the gear unit and/or the differential radially inside of the rotor can save axial installation space of the powertrain. Consequently, the powertrain is formed axially compact. For example, the gear unit is arranged completely spatially inside of the rotor of the electric machine. The differential is arranged completely spatially inside of the rotor of the electric machine, for example.

According to an aspect of the invention, at least a first transmission stage is drivingly arranged between the output shaft of the gear unit and the differential. In particular, the output shaft of the gear unit is arranged paraxial to the output axis. Accordingly, the output axis on which the driven shafts of the powertrain are arranged is paraxial to an input axis. At least the output shaft of the gear unit, preferably also the input shaft of the gear unit and/or the rotational axis of the rotor of the electric machine, are arranged coaxial to the input axis.

The first transmission stage is advantageously formed to increase the overall gear ratio and preferably comprises at least two toothed wheels in meshing engagement with one another, the rotational axis of the first toothed wheel being arranged coaxial to the output shaft of the gear unit, and the rotational axis of a further toothed wheel being arranged coaxial to the output axis. The first transmission stage can have a spur gear stage, for example.

Additionally, a second transmission stage can be provided, and the motive power is introduced at least indirectly into the differential from the gear unit via the first transmission stage and the second transmission stage. An intermediate shaft is provided, which is arranged parallel to the output shaft of the gear unit and to the output axis of the vehicle. Two further toothed wheels are preferably arranged on the intermediate shaft. The first toothed wheel of the intermediate shaft meshingly engages with a toothed wheel which is operatively connected at least indirectly to the output shaft, and the second toothed wheel of the intermediate shaft meshingly engages with a further toothed wheel which is at least indirectly operatively connected to the differential. The two transmission stages are formed as spur gear stages, for example, and can increase the overall gear ratio, the gear ratio being carried out in two stages. As a result of the axial offset, axial installation space of the powertrain is saved particularly along the input axis.

As an alternative to the bevel gear differential, the differential can be formed as an integral differential, as it is called, which has a second planetary gearset and a third planetary gearset, each planetary gearset being drivingly connected to a respective driven shaft. A first output torque is transmittable to the first driven shaft by the second planetary gearset, and a supporting torque of the second planetary gearset can be converted in the third planetary gearset in such a way that a second output torque corresponding to the first output torque is transmittable to the second driven shaft.

By "integral differential" is meant a differential with two planetary gearsets in which the second planetary gearset is drivingly connected to an input shaft of the differential and also to the third planetary gearset. The input shaft of the differential is at least indirectly connected to the output shaft of the gear unit. Alternatively, the input shaft of the differential can be connected integral to the output shaft of the gear unit. The second planetary gearset is drivingly connected to the first driven shaft. The third planetary gearset is drivingly connected to the second driven shaft. Further, the third planetary gearset is at least indirectly supported at a stationary housing of the gear unit or at the chassis of the motor vehicle, that is, connected thereto so as to be fixed with respect to relative rotation.

By an integral differential, the input torque of the input shaft of the differential is convertible and can be divided and transmitted to the two driven shafts in a defined ratio. The input torque is preferably transmitted at fifty percent, respectively, i.e., halved, to the driven shafts. Accordingly, the differential has no component part to which the sum of the two output torques is applied. Beyond this, with the speeds of the driven shafts being identical, the differential has no gear teeth revolving as a block or revolving without rolling motion. In other words, there is always a relative movement of the component parts of the respective planetary gearset that are in meshing engagement with one another irrespective of the output speeds of the driven shafts. By the differential, the overall gear ratio is adjusted and the differential function is performed at the same time. In other words, the integral differential realizes a torque increase and an apportioning of a motive power. Further, there is also a reduction in weight compared to a bevel gear differential.

The integral differential and the driven shafts are preferably adapted to be arranged coaxial to the output axis of the vehicle. Accordingly, the output axis extends coaxial to the input axis, namely, in particular, coaxial to the rotational axis of the rotor of the electric machine, coaxial to the input shaft of the gear unit and/or coaxial to the output shaft of the gear unit.

The powertrain according to one aspect of the invention and the gear unit according to one aspect of the invention are useable in purely electrically driven vehicles as well as in hybrid vehicles, which are drivable partially electrically and partially by an internal combustion engine. Depending on the construction and quantity of driven axles, the vehicle can also comprise two or more such powertrains or gear units, respectively, and one axle, a plurality of axles or all axles of the vehicle can be outfitted with the respective powertrain according to the invention and can be constructed to be drivable by the powertrains or gear units. Such a vehicle is a motor vehicle, particularly a passenger car, utility vehicle or truck.

It shall be understood that features of the present solutions described in the claims and/or drawings can also possibly be combined so that the achievable advantages and effects can be implemented cumulatively.

BRIEF DESCRIPTION OF THE DRAWINGS

The invention will be described in the following with reference to drawings depicting the various embodiment forms of the invention. Like or similar elements are designated with consistent reference numerals. In particular, the drawings show:

FIG. 5 is a schematic depiction of the powertrain with the gear unit a;

DETAILED DESCRIPTION OF THE PRESENTLY PREFERRED EMBODIMENTS

Figure 1:
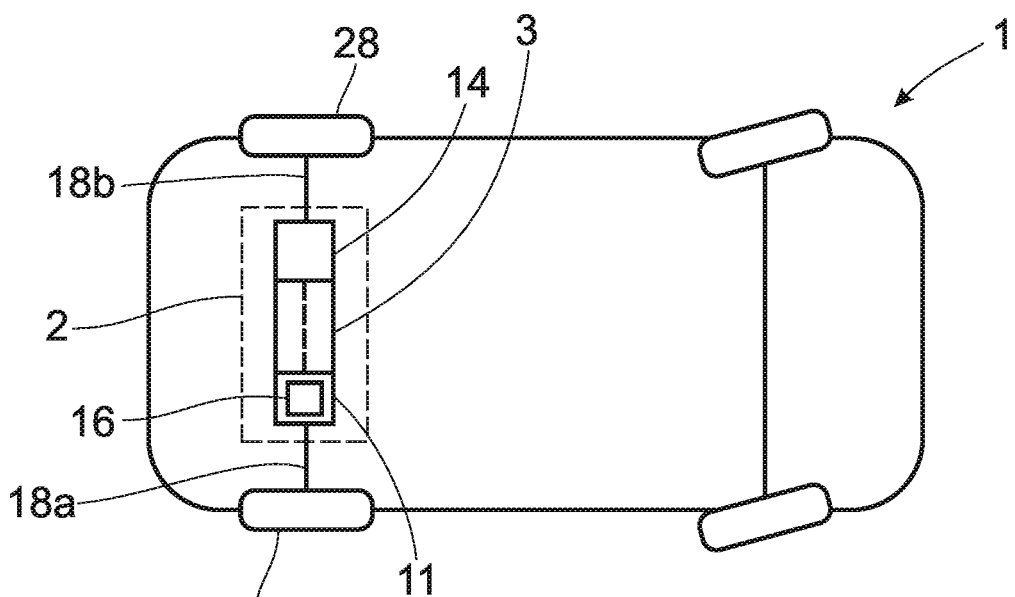
FIG. 1 is a vehicle comprising a powertrain with a gear unit.
Figure 2:
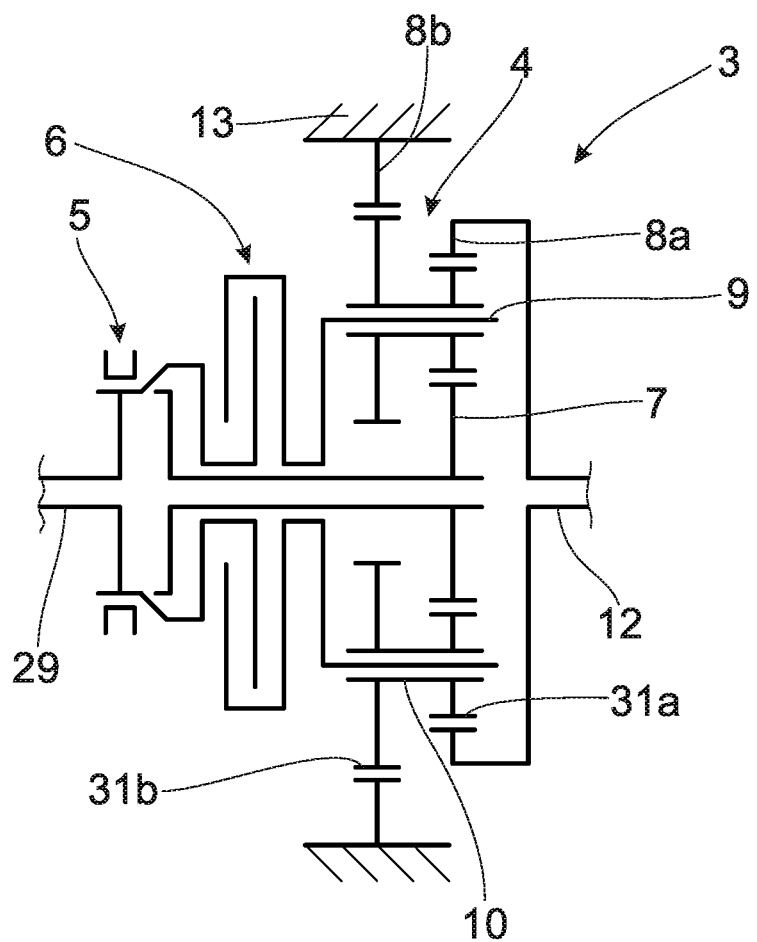
FIG. 2 is a schematic depiction of the gear unit shown in FIG. 1.
Figures 3, 4:
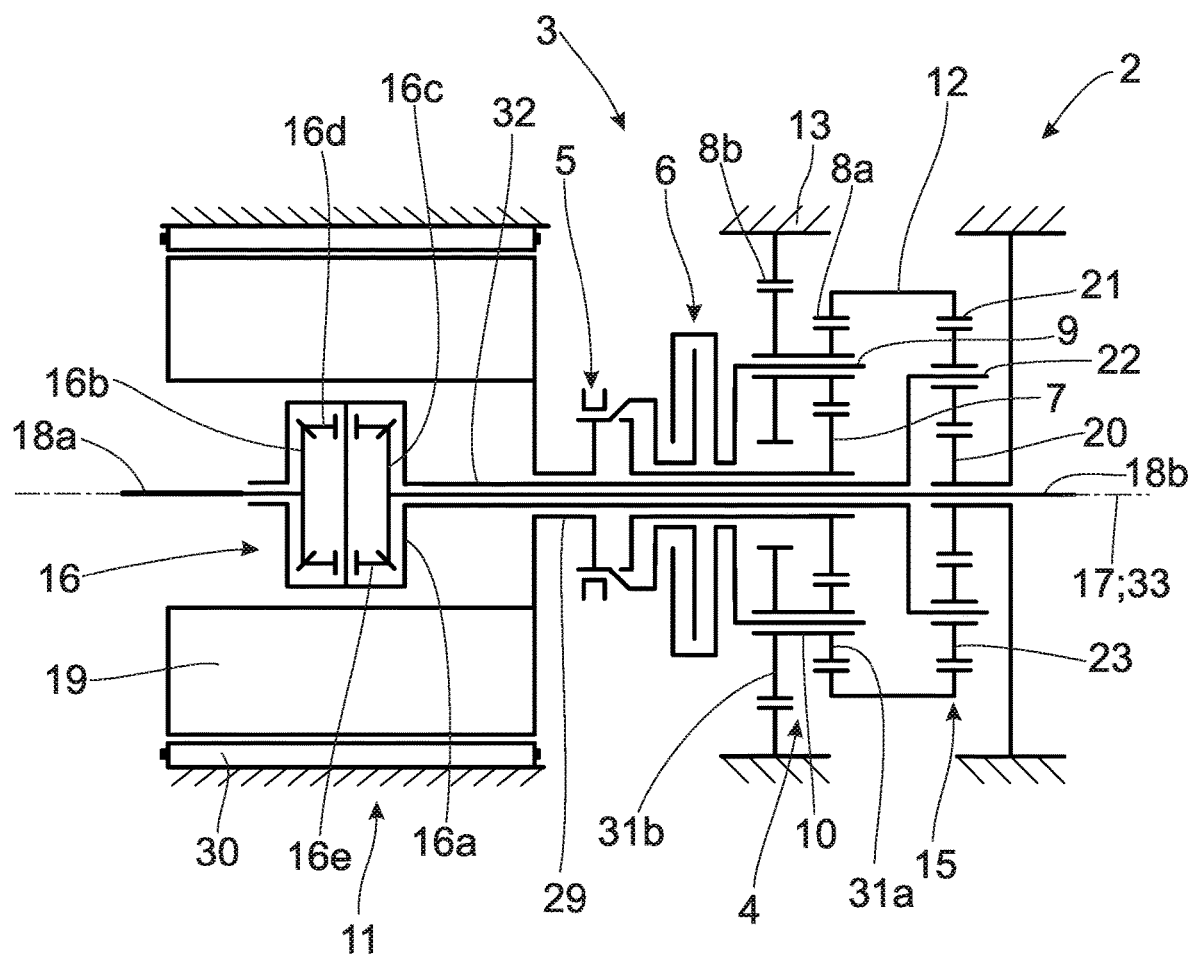
FIG. 3 is a schematic diagram of a shifting matrix relating to two shifting states for driving with a gear unit shown in FIG. 2.
FIG. 4 is a schematic depiction of the powertrain with the gear unit shown in FIG. 2.

FIG. 1 shows an electrically driven vehicle 1 with a powertrain 2 according to one aspect of the invention. The powertrain 2 comprises an electric machine 11 that generates power and introduces this power into a gear unit 3. The gear unit 3 is shown in FIG. 2, and the associated shifting matrix is shown in FIG. 3. The gear unit 3 is drivingly connected to a planetary gear assembly 14 that increases an overall gear ratio and transmits the power to a differential 16 arranged downstream in the power flow, in this instance spatially inside of the electric machine 11. The differential 16 divides the motive power between a first driven shaft 18a and a second driven shaft 18b that are in turn operatively connected to a driven wheel 28 of the vehicle 1 in each instance. The vehicle 1 can further comprise an energy accumulator supplied with electrical energy by the electric machine 11 in generator mode when the power flow is reversed. The energy accumulator can be a battery or the like. Accordingly, in generator mode, by the electric machine 11, electrical energy is generated, stored, and conserved for resupplying the electric machine 11.

The gear unit 3 from FIG. 1 is shown in a detailed diagram in FIG. 2. The gear unit 3 according to FIG. 2 can be acted upon by a motive power in the powertrain 2 according to FIG. 4 via an input shaft 29 with a rotor 19 of the electric machine 11, which rotor 19 is mounted so as to be rotatable relative to a stator 30. The input shaft 29 can be connected to the rotor 19 integrally or in more than one part; in any case, a rotationally locked driving connection exists. The gear unit 3 comprises a stepped planetary gearset 4 with a first ring gear 8a connected to an output shaft 12 of the gear unit 3 so as to be fixed with respect to rotation relative to it, a second ring gear 8b which is connected to a housing 13 of the gear unit 3 so as to be fixed with respect to rotation relative to it, a first sun gear 7 and a plurality of stepped planet gears 10 rotatably mounted at a first planet carrier 9. The gear unit 3 further has a first gear shifting element 5 and a second gear shifting element 6. The first gear shifting element 5 is adapted to drivingly connect the first sun gear 7 to the electric machine 11 in a closed state, and the second gear shifting element 6 is adapted to drivingly connect the first planet carrier 9 to the electric machine 11 in a closed state. To drive the output shaft 12 in rotation, only one of the two gear shifting elements 5, 6 is in the closed state. Consequently, the drive is carried out via the first sun gear 7 or via the first planet carrier 9. The first sun gear 7 is in meshing engagement with a first toothed wheel 31a of the respective stepped planet gear 10, and the first ring gear 8a is also in meshing engagement with the first toothed wheel 31a of the respective stepped planet gear 10. The second ring gear 8b is in meshing engagement with a second toothed wheel 31b of the respective stepped planet gear 10. The two toothed wheels 31a, 31b of the respective stepped planet gear 10 are connected with one another so as to be fixed against relative rotation. The output is carried out via the first ring gear 8a which is in meshing engagement with the second toothed wheel 31b of the respective stepped planet gear 10. The two toothed wheels 31a, 31b have different diameters and numbers of teeth so that two different gear ratios can be realized depending on which gear shifting element 5, 6 is closed or open. In the present instance, the first toothed wheel 31a of the respective stepped planet gear 10 has a smaller diameter than the second toothed wheel 31b of the respective stepped planet gear 10.

When the first gear shifting element 5 is in a closed state and the second gear shifting element 6 is in an open state, the first sun gear 7 is connected to the input shaft 29 so as to be fixed with respect to rotation relative to it so that a motive power of the electric machine 11 is conducted via the first sun gear 7 to the stepped planet gears 10 and then via the first ring gear 8a to the output shaft 12 of the gear unit 3. When the second gear shifting element 6 is in a closed state and the first gear shifting element 5 is in an open state, the first planet carrier 9 is connected to the input shaft 29 so as to be fixed with respect to rotation relative to it so that a motive power of the electric machine 11 is conducted via the first planet carrier 9 to the stepped planet gears 10 and then via the first ring gear 8a to the output shaft 12 of the gear unit 3. In an open state of the respective gear shifting element 5, 6, no torque is transmitted via the respective gear shifting element 5, 6. When both gear shifting elements 5, 6 are closed, a park lock function is realized because the stepped planetary gearset 4 is blocked in that the first sun gear 7 is connected to the first planet carrier 9 so as to be fixed with respect to relative rotation.

FIG. 3 shows the shifting matrix for a first gear step E1 and a second gear step E2 of the gear unit 3. The respective gear shifting element 5, 6 is closed where indicated by the "X" and open where there is no "X". An electric forward drive of the vehicle 1 with respective gear ratio is realized via the respective gear step E1, E2. When the first gear shifting element 5 is closed and the second gear shifting element 6 is open, the first gear step E1 is engaged and a first gear ratio is accordingly realized. When the second gear shifting element 6 is closed and the first gear shifting element 5 is open, the second gear step E2 is engaged and a second gear ratio that is not equal to the first gear ratio is accordingly realized. This shifting matrix applies to all of the depicted embodiment examples of the invention. Traction power shifting and/or coasting power shifting may be realized depending on the construction of the gear shifting elements 5, 6. In such a case, the respective gear shifting element 5, 6 is formed as a powershift element.

According to FIG. 2, the first gear shifting element 5 is formed as a positively engaging shifting element, in this case as a jaw-type shifting element. In the closed state of the first gear shifting element 5, a positively engaging connection is accordingly produced between the first sun gear 7 and the input shaft 29 of the gear unit 3. If necessary, these parts are synchronized before entering the positively engaging connection. On the other hand, the second gear shifting element 6 is formed in the present case as frictionally engaging shifting element, in this instance as a disk-type shifting element. Accordingly, in the closed state of the second gear shifting element 6, a frictionally engaging connection is produced between the first planet carrier 9 and the input shaft 29 of the gear unit 3. A synchronization of the rotational speeds of the parts is not required, and a frictionally engaging shifting element is suitable as power shifting element. In other words, the second gear shifting element 6 realizes a traction power shifting from gear step E1 into gear step E2, or vice versa. The load during shifting processes between gear steps E1, E2 is supportable by the first gear shifting element 5 formed as positively engaging until the second gear shifting element 6 is completely open or closed to prevent a load decrease at the output particularly during shifting processes. Alternatively, the two gear shifting elements 5, 6 may be formed as in the respective embodiment form according to FIG. 5, FIG. 6 or FIG. 7.

FIG. 4 shows the powertrain 2 having the gear unit 3 described above. In this respect, reference is made to the statements referring to FIG. 1 to FIG. 3. FIG. 4 also shows the electric machine 11 connectible to the first sun gear 7 or to the first planet carrier 9 via the input shaft 29 and the respective gear shifting element 5, 6. Further, the powertrain 2 has a planetary gear assembly 14 with a first planetary gearset 15. In the present case, the first planetary gearset 15 is formed as a negative planetary gearset and comprises a second sun gear 20 connected to the housing 13 of the gear unit 3 so as to be fixed with respect to relative rotation, a third ring gear 21 connected to the output shaft 12 of the gear unit 3 so as to be fixed with respect to rotation relative to it, and a plurality of planet gears 23 rotatably mounted at a second planet carrier 22. The third ring gear 21 is connected via the output shaft 12 of the gear unit 3 to the first ring gear 8a of the gear unit 3 so as to be fixed with respect to rotation relative to it such that the planetary gear assembly 14 is subsequently operatively connected to the output shaft 12 on the drive side. The output of the planetary gear assembly 14 is carried out via the second planet carrier 22 drivingly connected to a differential 16. Total gear ratios between 6 and 13.5, for example, can be realized by such a combination comprising gear unit 3 and planetary gear assembly 14.

In the present case, the differential 16 is formed as a bevel gear differential and drivingly connects the gear unit 3 via the planetary gear assembly 14 to the two driven shafts 18a, 18b arranged coaxial to an output axis 17, the second driven shaft 18b being guided through the gear unit 3 and the planetary gear assembly 14 in the present instance. The bevel gear differential 16 known from the prior art has two output elements on the wheel side which are formed as a first driven wheel 16b and second driven wheel 16c. The driven wheels 16b, 16c mesh, respectively, with a compensating element 16d, 16e. The compensating elements 16d, 16e are mounted in a differential carrier 16a so as to be rotatable around their own axes. The first driven wheel 16b is connected to the first driven shaft 18a so as to be fixed with respect to rotation relative to it, and the second driven wheel 16c is connected to the second driven shaft 18b so as to be fixed with respect to rotation relative to it. The differential carrier 16a of the differential 16 is connected via an intermediate shaft 32 to the second planet carrier 22 so as to be fixed with respect to rotation relative to it, the intermediate shaft 32 being guided through the gear unit 3 coaxial to the input shaft 29 and output shaft 12 of the gear unit 3 and connected to the differential carrier 16a. The differential 16 is arranged completely spatially inside of the rotor 19 of the electric machine 11 in order to save axial installation space. Accordingly, in this case the output axis 17 extends coaxial to an input axis 33 of the vehicle, and a rotational axis of the rotor 19, the input shaft 29 and the output shaft 12 of the gear unit 3 are arranged coaxial to the input axis 33. The gear unit 3 is arranged axially between the electric machine 11 and the differential 16 on one side and the planetary gear assembly 14 on the other side.

Figure 5:
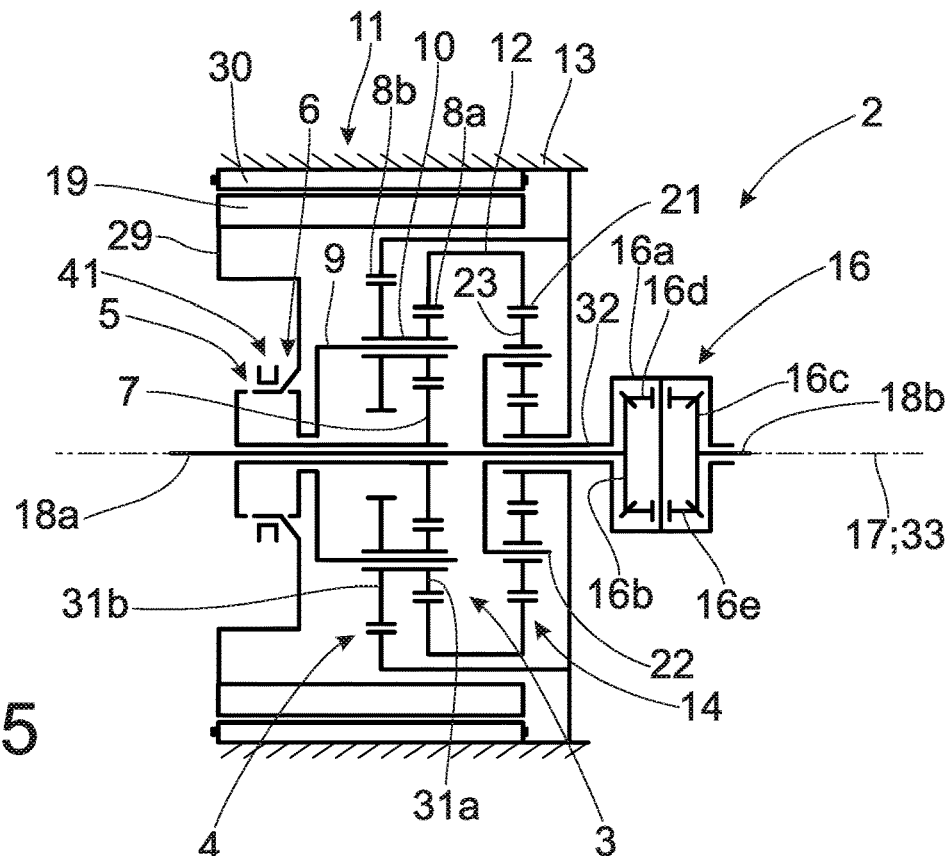

The powertrain 2 according to FIG. 5 comprises the gear unit 3 from FIG. 2 with the difference that the two gear shifting elements 5, 6 are formed as jaw-type shifting elements and are combined to form a double shifting element 41. Therefore, reference is made to the statements relating to the gear unit 3 from FIG. 2. Alternatively, the two gear shifting elements 5, 6 may be formed as in the respective embodiment form according to FIG. 4, FIG. 6 or FIG. 7. Reference is made to the description relating to FIG. 3 for the shifting between the first gear step E1 and second gear step E2. The gear unit 3 comprising the stepped planetary gearset 4 and the two gear shifting elements 5, 6 is arranged spatially completely inside of the rotor 19 of the electric machine 11 in order to save axial installation space and make the powertrain 2 more compact. The gear shifting elements 5, 6 are arranged directly adjacent one another coaxial to the input axis 33 and output axis 17 and together form the double shifting element 41 compactly comprised of the two gear shifting elements 5, 6. The gear shifting elements 5, 6 realize a positively engaging connection between the input shaft 29 of the gear unit 3 and the first sun gear 7 or first planet carrier 9 in the closed state. A particularly cost-optimized and efficiency-optimized clutch system is provided in this way.

The first planetary gearset 15 of the planetary gear assembly 14 is formed as a negative planetary gearset and comprises a third ring gear 21 connected to the output shaft 12 of the gear unit 3 so as to be fixed with respect to rotation relative to it, a stationary second sun gear 20 connected to the housing 13 so as to be fixed with respect to rotation relative to it, and a plurality of planet gears 23 rotatably mounted at a second planet carrier 22. The third ring gear 21 is connected to the first ring gear 8a of the gear unit 3 via output shaft 12 so as to be fixed with respect to rotation relative to it such that the planetary gear assembly 14 is subsequently operatively connected to the output shaft 12 of the gear unit 3 on the drive side. The output of the planetary gear assembly 14 is carried out via the second planet carrier 22 connected to a differential carrier 16a of the differential 16 so as to be fixed with respect to rotation relative to it. The differential 16 is formed as a bevel gear differential and is further identical to the differential 16 according to FIG. 4 so that the relevant statements apply here. Total gear ratios of between 6 and 13.5 can be achieved by such a combination comprising gear unit 3 and planetary gear assembly 14.

The differential 16 drivingly connects the gear unit 3 to the driven shafts 18a, 18b via the planetary gear assembly 14. In the present case, the first driven shaft 18a is guided axially through the gear unit 3 and the electric machine 11. The planetary gear assembly 14 is arranged axially between the electric machine 11 and the gear unit 3 on the one hand and the differential 16 on the other hand. Alternatively, it is conceivable that the differential 16 is also arranged together with the gear unit 3 spatially inside of the rotor 19 of the electric machine 11 in order to save additional axial installation space. The differential 16 is drivingly connected to the second planet carrier 22 via an intermediate shaft 32. The intermediate shaft 32 is arranged coaxial to the output shaft 12 of the gear unit 3. In this instance, the output axis 17 is also arranged coaxial to an input axis 33.

Figure 6:
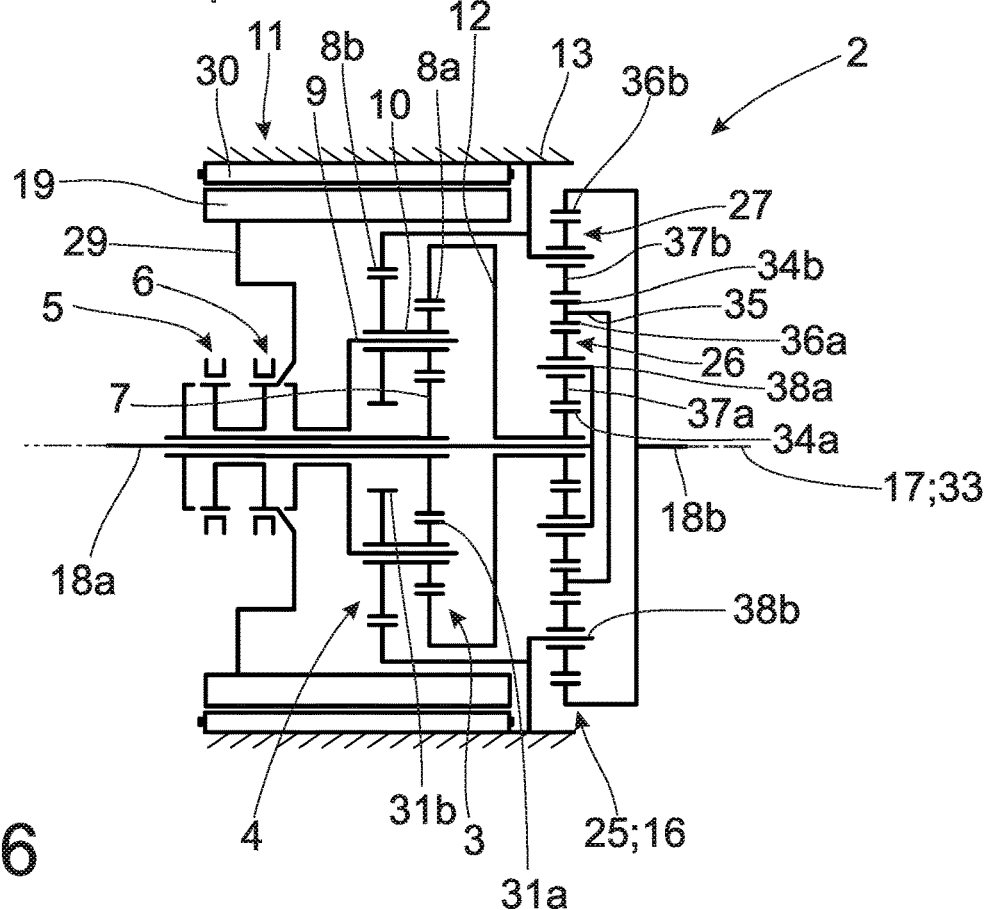
FIG. 6 is a schematic depiction of the powertrain with the gear unit.

The powertrain 2 according to FIG. 6 comprises the gear unit 3 from FIG. 2 with the difference that the two gear shifting elements 5, 6 are formed as jaw-type shifting elements. Therefore, reference is made to the statements pertaining to the gear unit 3 from FIG. 2. Reference is made to the description of FIG. 3 for the shifting between the first gear step E1 and the second gear step E2. FIG. 6 shows a third embodiment example of the powertrain 2 according to the invention. In the present instance, the gear unit 3 comprising the stepped planetary gearset 4 and the two gear shifting elements 5, 6 are arranged spatially completely inside of the rotor 19 of the electric machine 11 in order to save axial installation space of the powertrain 2. The gear shifting elements 5, 6 realize a positively engaging connection between the input shaft 29 of the gear unit 3 and the first sun gear 7 or first planet carrier 9 in the closed state. A particularly cost-optimized and efficiency-optimized clutch system is provided in this way. Alternatively, it is conceivable that the respective gear shifting elements 5, 6 formed in each instance as jaw-type shifting element are combined and formed as a double shifting element as in FIG. 5. Further alternatively, the two gear shifting elements 5, 6 can be formed as in the respective embodiment form according to FIG. 4 or FIG. 7.

In contrast to the powertrains 2 according to FIG. 4 and FIG. 5 which have a differential 16 formed as bevel gear differential, the powertrain 2 according to FIG. 6 comprises a differential 16 formed as integral differential 25 with a second planetary gearset 26 and a third planetary gearset 27. The two planetary gearsets 26, 27 are arranged either axially adjacent one another or radially one above the other depending on the requirements of the integral differential 25, particularly the gear ratio to be realized by the integral differential 25. In the present case, the planetary gearsets 26, 27 are arranged radially one above the other so that axial installation space of the powertrain 2 is saved. In other words, the planetary gearsets 26, 27 lie in a common plane perpendicular to the driven shafts 18a, 18b or output axis 17, respectively. Consequently, the integral differential 25 is constructed in a radially nested type of construction.

A first output torque can be transmitted to the first driven shaft 18a by the second planetary gearset 16. A supporting torque of the second planetary gearset 26 acting opposite the first output torque is transmitted to the third planetary gearset 27 and is convertible in the third planetary gearset 27 in such a way that a second output torque corresponding to the first output torque can be transmitted to the second driven shaft 18b. The integral differential 25 is formed as planetary gear assembly. The integral differential 25 is operatively connected to the gear unit 3 via the input shaft of the integral differential 25 which is simultaneously the output shaft 12 of the gear unit 3. The output at the integral differential 25 is carried out via the two driven shafts 18a, 18b. In other words, a motive power is distributed to two driven shafts 18a, 18b by the integral differential 25. In the present case, the first driven shaft 18a extends through the gear unit 3 and the electric machine 11. The second driven shaft 18b extends away from the powertrain 2 in the opposite direction. Due to the fact that the integral differential 25 which increases a torque coming from the gear unit 3 is arranged after the gear unit 3 at the end of the powertrain 2, the component parts arranged upstream thereof in the power flow can be formed comparatively small and slender so that production is more economical and the overall weight of the powertrain 2 is reduced. The driven shafts 18a, 18b, the integral differential 25, the electric machine 11 and the gear unit 3 are arranged coaxial to the input axis 33 of the gear unit 3 and to the output axis 17 of the vehicle 1.

The output shaft 12 of the gear unit 3 is connected to a third sun gear 34a of the second planetary gearset 26 so as to be fixed with respect to rotation relative to it. Accordingly, the first ring gear 8a is connected to the third sun gear 34a so as to be fixed with respect to rotation relative to it. The transmission of power from the second planetary gearset 26 to the third planetary gearset 27 is carried out via a coupling shaft 35 connected to a fourth ring gear 36a of the second planetary gearset 26 so as to be fixed with respect to rotation relative to it on the one hand and, on the other hand, is connected to a fourth sun gear 34b of the third planetary gearset 27 so as to be fixed with respect to rotation relative to it. In particular, the coupling shaft 35, the fourth ring gear 36a and the fourth sun gear 34b are connected integral with one another. The coupling shaft 35 with the fourth ring gear 36a and the fourth sun gear 34b can also be formed as a ring gear which has not only an inner toothing but also an outer toothing. A plurality of second planetary gears 37a is arranged spatially between the third sun gear 34a and the fourth ring gear 36a, in the present instance so as to be rotatable on a rotatably mounted third planet carrier 38a. Further, a plurality of third planetary gears 37b which are arranged in the present case so as to be rotatable on a fourth planet carrier 38b fixed with respect to the housing are arranged on the same radially extending plane and radially outside of the second planetary gearset 26 spatially between the fourth sun gear 34b and a fifth ring gear 36b of the third planetary gearset 27. The first output on the first driven shaft 18a is carried out via the third planet carrier 38a of the second planetary gearset 26, which third planet carrier 38a is connected to the first driven shaft 18a so as to be fixed with respect to rotation relative to it. The second output on the second driven shaft 18b is carried out via the fifth ring gear 36b of the third planetary gearset 27, which fifth ring gear 36b is connected to the second driven shaft 18b so as to be fixed with respect to rotation relative to it.

Figure 7:
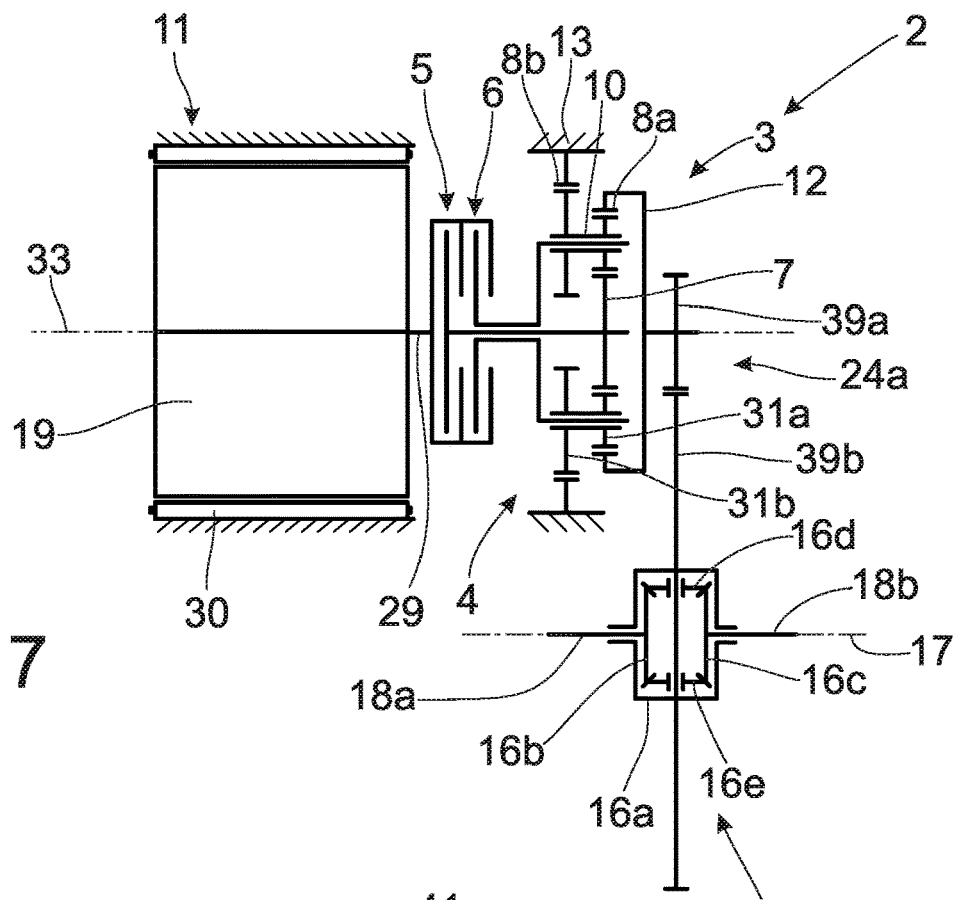
FIG. 7 is a schematic depiction of the powertrain with the gear unit.

According to a fourth embodiment example of the powertrain 2 shown in FIG. 7, the gear unit 3 is arranged axially between the electric machine 11 and the differential 16, the differential 16 being arranged on the output axis 17 arranged paraxial to the input axis 33 in the present case. Accordingly, the input shaft 29 and the output shaft 12 of the gear unit 3 are arranged on the input axis 33. In the present case, the gear unit 3 is formed substantially identical to the embodiment example according to FIG. 2a with respect to its functioning. The direct drive of the stepped planetary gearset 4 is realized by shifting the second gear shifting element 6 into the closed state with the attendant rotationally fixed connection between the first ring gear 8a and the first planet carrier 9. The output shaft 12 is drivingly connected via a transmission stage 24 which, in the present case, is formed to be single-stage and comprises a third toothed wheel 39a connected to the output shaft 12 so as to be fixed with respect to rotation relative to it and a fourth toothed wheel 39b connected to a differential carrier 16a of the differential 16 so as to be fixed with respect to rotation relative to it. In particular, the fourth toothed wheel 39b can be formed directly as toothing at the differential carrier 16a. In the present case, the toothed wheels 39a, 39b are formed as spur gears so that the transmission stage 24 is consequently a spur gear stage. The transmission stage 24 influences the overall gear ratio of the powertrain 2 by a suitably configured toothed wheel diameter and number of teeth. In this respect, an additional planetary gear assembly 14 corresponding to the embodiment examples according to FIG. 4 and FIG. 5 can be dispensed with. However, depending on the requirements of the powertrain, it may be useful to provide a further gear unit for increasing a total gear ratio. As a result of the paraxial arrangement of the powertrain components, axial installation space is economized in the powertrain 2, that is, in particular in that the electric machine 11 together with the gear unit 3 are arranged radially adjacent the differential 16. In this way, the electric machine 11 can also be made more slender, which in turn has a positive effect on the axial spacing between the input axis 33 and output axis 33. In the present case, the differential 16 is formed as a bevel gear differential and, further, is identical to the differential 16 according to FIG. 4. Reference is made to the relevant statements.

In the present case, the two gear shifting elements 5, 6 of the gear unit 3 are formed as disk-type shifting elements and realize in each instance a frictionally engaging connection between the input shaft 29 of the gear unit 3 and the first sun gear 7 or first planet carrier 9 in the closed state. In this regard, it is advantageous that both traction shifts and coasting shifts can be power-shifted between gear steps E1 and E2, or vice versa. The load during shifting processes between the gear steps E1, E2 can be supported by the first gear shifting element 5 until the second gear shifting element 6 is completely open or closed, or vice versa, thereby preventing a load decrease at the output particularly during shifting processes. In other words, the gear shifting elements 5, 6 are power shifting elements in the present case. Consequently, the powertrain 2 according to FIG. 7 comprises the gear unit from FIG. 2 with the difference that the two gear shifting elements 5, 6 are formed as disk-type shifting elements. Therefore, reference is made to the statements relating to the gear unit 3 from FIG. 2. As regards the shifting between the first gear step E1 and second gear step E2, reference is made to the description relating to FIG. 3. Alternatively, the two gear shifting elements 5, 6 can be formed as in the embodiment form according to FIG. 4, FIG. 5 or FIG. 6.

Figure 8:
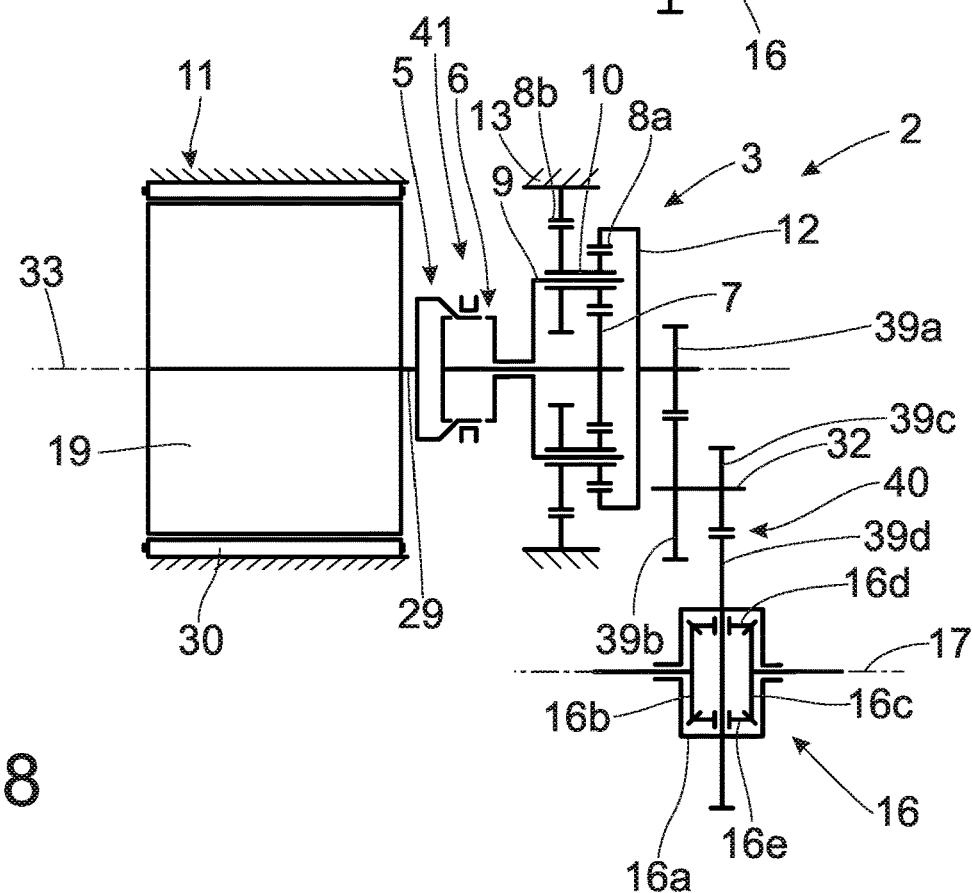
FIG. 8 is a schematic depiction of the powertrain with the gear unit.

FIG. 8 shows a fifth embodiment example of the powertrain 2 in which the gear unit 3 is arranged axially between the electric machine 11 and the differential 16. Analogous to FIG. 7, the differential 16 formed as a bevel gear differential is arranged on the output axis 17 paraxial to the input axis 33 on which the input shaft 29 and the output shaft 12 of the gear unit 3 lie. The output shaft 12 of the gear unit 3 is operatively connected to the differential 16 via two transmission stages 24, 40. The first transmission stage 24 comprises a third toothed wheel 39a which is connected to the output shaft 12 so as to be fixed with respect to rotation relative to it and a fourth toothed wheel 39b which is connected to an intermediate shaft 32 arranged paraxial to the input axis 33 and output axis 17 so as to be fixed with respect to rotation relative to the intermediate shaft 32. Axially adjacent the fourth toothed wheel 39b, a fifth toothed wheel 39c of the second transmission stage 40 is arranged on the intermediate shaft 32 so as to be fixed with respect to rotation relative to it, this intermediate shaft 32 being in meshing engagement with a sixth toothed wheel 39d which is operatively connected to the differential 16. The two transmission stages 24, 40 influence the overall gear ratio of the powertrain 2 by correspondingly configuring the toothed wheel diameters and number of teeth of the toothed wheels 39a-39d. The toothed wheels 39a-39d are formed in the present instance as spur gears, and the transmission stages 24, 40 are consequently spur gear stages. Axial installation space is saved in the powertrain 2 through paraxial arrangement of the powertrain components, particularly in that the electric machine 11 together with the gear unit 3 are arranged radially adjacent the differential 16. Accordingly, the electric machine 11 can also be made more slender, which in turn has a positive effect on the axial spacing between the input axis and output axis.

The two gear shifting elements 5, 6 of the gear unit 3 are arranged directly adjacent one another coaxial to the input axis 33 and together form a double shifting element 41 which combines the two gear shifting elements 5, 6. In the present case, the two gear shifting elements 5, 6 are formed as jaw-type shifting elements as in the embodiment example according to FIG. 5 to which reference is made. For shifting between the first gear step E1 and second gear step E2, reference is made to the description relating to FIG. 3. Further, reference is made to the statements relating to FIG. 7 and the reference numerals used therein, particularly to FIG. 2 and FIG. 5. Alternatively, the two gear shifting elements 5, 6 can be formed as in the respective embodiment form according to FIG. 4, FIG. 6 or FIG. 7. As a further alternative, the gear unit 3 can be arranged inside of the rotor 19 as in the embodiment forms according to FIG. 5 and FIG. 6.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A gear unit for a powertrain of an at least partially electrically driven vehicle, comprising:
    a housing;
    a first planet carrier;
    a stepped planetary gearset having:
        a first sun gear;
        a first ring gear fixedly connected with respect to rotation to an output shaft of the gear unit;
        a second ring gear is fixedly connected with respect to rotation to the housing; and
        a plurality of stepped planet gears rotatably mounted at the first planet carrier;
    a first gear shifting element configured to drivingly connect the first sun gear to an electric machine in a closed state; and
    a second gear shifting element configured to drivingly connect the first planet carrier to the electric machine in a closed state;
    wherein one of the first gear shifting element and the second gear shifting element is in the closed state for driving the output shaft in rotation; and
    a differential that drivingly connects the gear unit to two driven shafts arranged coaxial to an output axis,
    wherein the differential is an integral differential comprises:
        a second planetary gearset configured to transmit a first output torque to a first driven shaft; and
        a third planetary gearset drivingly connected to a respective driven shaft,
        wherein a supporting torque of the second planetary gearset is convertible in the third planetary gearset such that a second output torque corresponding to the first output torque is transmittable to a second driven shaft.

2. The gear unit according to claim 1, wherein the first gear shifting element is a positively engaging shifting element.

3. The gear unit according to claim 1, wherein the first gear shifting element is a frictionally engaging shifting element.

4. The gear unit according to claim 1, wherein the second gear shifting element is a positively engaging shifting element.

5. The gear unit according to claim 1, wherein the second gear shifting element is a frictionally engaging shifting element.

6. The gear unit according to claim 1, wherein the first gear shifting element and the second gear shifting element are formed jointly as a double shifting element.

7. A powertrain for a vehicle that is at least partially electrically driven, comprising:
    an electric machine;
    a gear unit, comprising:
        a housing;
        a first planet carrier;
        a stepped planetary gearset having:
            a first sun gear;
            a first ring gear fixedly connected with respect to rotation to an output shaft of the gear unit;
            a second ring gear is fixedly connected with respect to rotation to the housing; and
            a plurality of stepped planet gears rotatably mounted at the first planet carrier;
        a first gear shifting element configured to drivingly connect the first sun gear to the electric machine in a closed state; and
        a second gear shifting element configured to drivingly connect the first planet carrier to the electric machine in a closed state;
        wherein one of the first gear shifting element and the second gear shifting element is in the closed state for driving the output shaft in rotation; and
    a differential that drivingly connects the gear unit to two driven shafts arranged coaxial to an output axis, wherein the differential is an integral differential comprises:
        a second planetary gearset configured to transmit a first output torque to a first driven shaft; and
        a third planetary gearset drivingly connected to a respective driven shaft,
        wherein a supporting torque of the second planetary gearset is convertible in the third planetary gearset such that a second output torque corresponding to the first output torque is transmittable to a second driven shaft.

8. The powertrain according to claim 7, wherein the differential is a bevel gear differential.

9. The powertrain according to claim 7, further comprising a planetary gear assembly having at least a first planetary gearset, the planetary gear assembly drivingly connected to the output shaft of the gear unit.

10. The powertrain according to claim 9, wherein the first planetary gearset of the planetary gear assembly comprises:
    a second sun gear fixed with respect to the housing;
    a third ring gear; and
    a plurality of planet gears rotatably mounted at a second planet carrier,
    wherein the third ring gear is fixedly connected with respect to rotation to the first ring gear of the gear unit.

11. The powertrain according to claim 10, wherein a differential carrier (16a) of the differential is fixedly connected with respect to rotation to the second planet carrier of the planetary gear assembly.

12. The powertrain according to claim 7, wherein the gear unit and/or the differential are/is arranged at least partially or completely spatially inside of a rotor of the electric machine.

13. The powertrain according to claim 7, wherein at least a first transmission stage is drivingly arranged between the output shaft of the gear unit and the differential.

14. The powertrain according to claim 7, wherein the integral differential and the two driven shafts are configured to be arranged coaxial to an output axis of the vehicle.

* * * * *